United States Patent [19]

Walser

[11] Patent Number: 4,791,264
[45] Date of Patent: Dec. 13, 1988

[54] LOW FORCE WIRE GUIDE FOR EDM MACHINE

[75] Inventor: Thomas D. Walser, Chesaning, Mich.

[73] Assignee: Raycon Textron Inc., Ann Arbor, Mich.

[21] Appl. No.: 43,889

[22] Filed: Apr. 29, 1987

[51] Int. Cl.⁴ .............................................. B23H 7/10
[52] U.S. Cl. .............................................. 219/69 W
[58] Field of Search ............ 219/69 W, 69 E, 137.44; 226/196, 198, 199; 242/157 R; 204/206

[56] References Cited

U.S. PATENT DOCUMENTS

| | | | |
|---|---|---|---|
| 3,517,153 | 6/1970 | Check | 219/69 E |
| 3,534,922 | 10/1970 | Keith et al. | 226/196 |
| 3,730,136 | 5/1973 | Okada | 219/137.44 |
| 3,775,580 | 11/1973 | Scherbaum | 219/137.44 |
| 4,205,212 | 5/1980 | Ullmann et al. | 219/69 W |

FOREIGN PATENT DOCUMENTS

| | | | |
|---|---|---|---|
| 473434 | 5/1951 | Canada | 219/137.44 |
| 186534 | 10/1983 | Japan | 219/69 W |
| 463529 | 4/1975 | U.S.S.R. | 219/69 E |
| 753579 | 8/1980 | U.S.S.R. | 219/69 W |

Primary Examiner—A. D. Pellinen
Assistant Examiner—Geoffrey S. Evans
Attorney, Agent, or Firm—John C. Evans

[57] ABSTRACT

A wire guide directs a wire electrode from a refeed mechanism in an electrical discharge machine EDM to a workpiece. The wire guide has a tension cap and a fixed wire guide body ceramic insert defining a precision guide slot for the electrode and wherein the tension cap is biased by a flex ring mounted on separated ends of the tension cap and body to retain them together. The biased tension cap has tapered surfaces at its exit end which produce a compound tension force on the electrode for maintaining a low friction force thereon during the life of the wire guide.

12 Claims, 2 Drawing Sheets

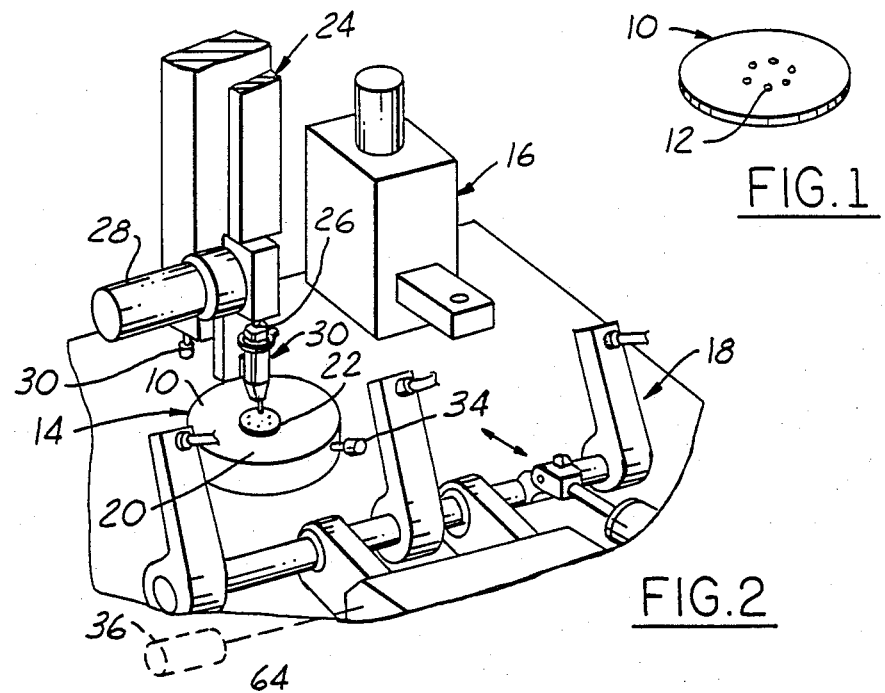
FIG. 1
FIG. 2
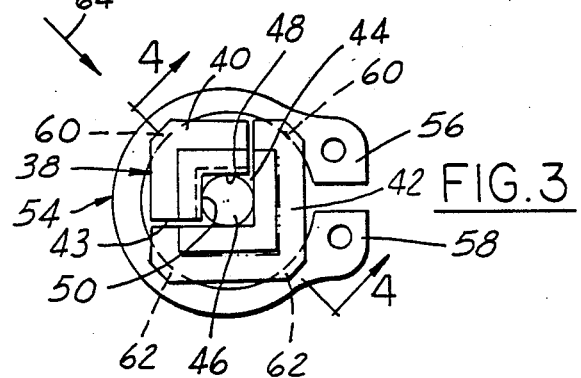
FIG. 3
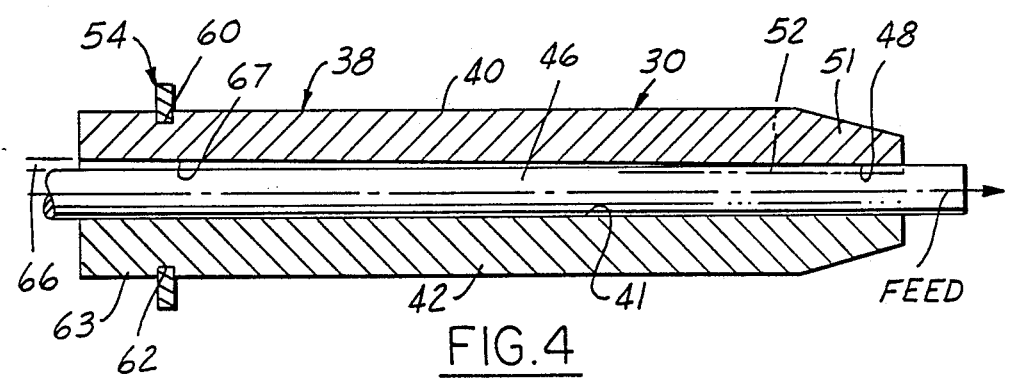
FIG. 4

LOW FORCE WIRE GUIDE FOR EDM MACHINE

FIELD OF THE INVENTION

This invention relates to electric discharge machines (EDM); more particularly, it relates to a wire guide for use in apparatus for machining multiple parts or workpieces with substantially uniform accuracy.

BACKGROUND OF THE INVENTION AND PRIOR ART

In many applications, electric discharge machining is used for the mass production of parts which must be machined to close tolerances. There are several factors which affect the repeatability of accuracy of machining by the EDM process including the process parameters of electrode size, spark energy, spark current, gap length, gap voltage and the wire guide used to direct the electrode to a workpiece. For example, when the EDM process is used to machine a small hole through a thin plate, the small dimensions of the wire electrode require a support system which is sufficiently accurate to support the electrode in all directions. Also, mechanical or electrical vibrations in the electrode system can result in variation in hole diameters. In the case of wire guides for directing electrodes with respect to an orifice plate for fuel injectors, for example, the electrode, even though closely guided, may have a biasing force acting thereon that can bend the wire between the wire feed and the wire guide which positions the wire electrode with respect to the work piece.

The biasing force acting on the wire electrode should be maintained throughout the life of the electrode guide and should be at a level which will prevent wire bending. Furthermore, the wire electrode should have a zero clearance between the wire guide at the exit from the wire guide to form accurately positioned holes in the workpiece.

Accordingly, there is a need for obtaining improved uniformity and accuracy in guiding an electrode wire in EDM apparatus. Further, it should be achieved without affecting the various other parameters involved in improving accuracy of the EDM process.

U.S. Ser. No. 039,065, filed Apr. 16, 1987, entitled Wire Guide for Electric Discharge Machine, discloses one arrangement for imposing a spring force on a wire electrode to control the position of a wire electrode with respect to a work piece. The wire guide housing engages the wire electrode throughout the length of the housing. This increases the friction force on the wire as it is advanced with respect to the wire guide.

SUMMARY OF THE INVENTION

A feature of this invention is to provide an improved wire guide for use in apparatus for electric discharge machining to obtain a high degree of repeatable accuracy in the machining of parts by applying frictional force on the guided wire only at the exit end of the wire guide so as to reduce the frictional force on the guided wire. The force is applied while maintaining zero clearance between the guided wire and wire guide and the low frictional force is maintained throughout the life of the electrode guide.

A wire electrode guide for achieving the desired objective feeds a wire electrode to a spark gap at a conductive workpiece by means including first and second elongated segments having an opening formed therebetween through out the length thereof; one of said segments is L shaped and includes a fixed reference surface throughout the length thereof to supportingly receive a wire electrode extending through said guide; the other of said segments is a tension cap which includes means thereon to guide the wire electrode only at one end thereof; spring means connected to said first and second elongated segments force them toward each other and the tension cap has means for producing a compound tension force on the wire electrode as it exits the guide thereby to maintain a low frictional force on the wire electrode as it is moved relative to said guide.

In accordance with the invention, apparatus is provided for electric discharge machining of workpieces on a mass production basis with greater workpiece feature formation repeatability than achieved heretofore. This is accomplished by imposing a compound tension force on the electrode through spring biased tapered guide surfaces whereby the guided wire has a zero clearance with a fixed wire guide body and has a low frictional force imposed thereon throughout the life of the electrode guide. The spring bias is applied by a flex retaining ring which is seated in grooves formed in the opposite end of a pair of elongated, split, members one of which is a tension cap having tapered guide surfaces thereon and the other of which is a fixed wire guide body.

Further, according to the invention, a wire guide is provided for use in electric discharge machines which includes means which hold a wire electrode position to produce workpiece features having a specified size within predetermined tolerances. Specifically, two elongated members each having an L shaped cross-section are arranged to form a wire guide hole of rectangular shape in which a guided wire is located for relative movement with respect to the workpiece. The elongated members are grooved at one end and receive a flex retaining ring that biases the opposite end of the elongated members toward one another. One of the members constitutes a fixed wire guide body and the other member is a tension cap having two tapered surfaces thereon arranged generally perpendicularly with respect to one another. The tapered surfaces extend only through the exit end of the other member and engage the guided wire only at one segment thereof. The biasing action of the retaining ring will produce zero clearance between the guided wire and the fixed wire guide body and the elongated members are configured on the interior surfaces thereof to maintain a clearance between the tension cap and the guided wire at other points of the tension cap so as to reduce the friction forces acting on the guided wire during movement thereof with respect to the tension cap.

BRIEF DESCRIPTION OF THE DRAWINGS

Further objects and advantages of the invention will appear from the following description taken together with the accompanying drawings in which:

FIG. 1 is a perspective view of a workpiece formed by use of the present invention;

FIG. 2 is a fragmentary, diagrammatic view of an electrical machine including the present invention;

FIG. 3 is an elevational view looking in the direction of the arrow 3 in FIG. 1;

FIG. 4 is a longitudinal sectional view taken along the line 4—4 of FIG. 3 looking in the direction of the arrows;

BEST MODE FOR CARRYING OUT THE INVENTION

Figure 5:
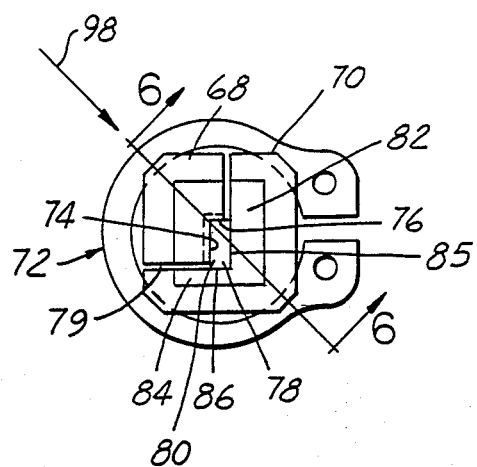
FIG. 5 is an end elevational view of another embodiment of the invention.

Referring now to the drawings, there is shown illustrative embodiments of the invention for use as wire guides in EDM machines. A hole or set of holes is the workpiece feature to be machined to a specified size, as measured by its fluid flow capacity. It will be appreciated as the description proceeds that the invention may be embodied in many different forms and utilized for many different applications.

In the illustrative embodiment of the invention to be described, an electric discharge machining apparatus is utilized for machining a set of small holes in a thin plate. In particular, the example workpiece is an orifice plate for a fuel injection nozzle for use in an automotive engine. Such workpieces or parts must be manufactured in high volume using mass production techniques and must be held to very close dimensional tolerances. As shown in FIG. 1, the workpiece or part comprises a circular plate 10 with a set of five small holes 12 in a circular array surrounding the center of the plate 10. In the example workpiece, each of the holes has a specified diameter of six thousandths of an inch with a tolerance of plus or minus one ten thousandth of an inch. The set of holes of such size, taken collectively, has a certain fluid flow capacity. Measured flow capacity is used as an index of size.

The electric discharge machine embodying the invention is shown diagrammatically in FIG. 2. In general, it comprises a machining station 14, a test station 16 and a workpiece transfer mechanism 18 is adapted to move each workpiece through the successive stations.

If desired, the machine can include a workpiece feed station and a workpiece sorting station. Such stations and their operation are further discussed in copending U.S. Ser. No. 78,115 filed Sept. 27, 1985, for Method and Apparatus for Electric Discharge Machining, the specification of which is incorporated herein by reference.

The machining station 14 comprises a workpiece holder 20 which has a nest 22 thereon adapted to receive the workpiece 10. The holder 20 is mounted on an index table or turret (not shown) which is adapted to rotate the holder 20 to position the workpiece 10 in six different angular positions, one for each hole to be machined. The head of the electric discharge machine comprises a carriage 24 for feeding a wire electrode 26 for machining the holes in the workpiece at the work station on the holder 20. The wire electrode 26 passes through a refeed mechanism 28 and a wire guide 30 to the workpiece. The refeed mechanism 28 is adapted to advance the electrode wire, which is supplied from a spool (not shown), relative to the carriage 24 upon retraction of the carriage after each machining operation. After each machining operation to form one of the holes 12, the downward limit of the carriage 24 is sensed by a limit switch 32 which causes the holder 20 to be indexed to place the next hole location at the work station on the holder. When the holder 20 is indexed to the position for machining the last hole in the workpiece, a limit switch 34 enables the actuation of a transfer drive 36 of the transfer mechanism 18. Upon completion of machining of the last hole in the workpiece the limit switch 32 causes energization of the drive 36 and the transfer mechanism 18 is actuated to transfer the workpiece 10 from the machining station 14 to the test station 16. The test station 16 and its operation are more specifically set forth in copending U.S. Ser. No. 781,115.

The workpiece 10 is electrically conductive so that when the proper gap is established between the wire electrode 26 and the workpiece 10 a spark is established and maintained during the electrical discharge machining process. A suitable process is fully described in copending U.S. Ser. No. 781,115, it being understood, however, that the present invention is suitable for use with a wide range of EDM machines.

Referring now to FIGS. 3-6, the wire guide 30 of the present invention includes a wire guide housing 38 with spaced elongated segments 40, 42 each of which are L shape in cross-section as shown in FIG. 3 and separated by a break line 43.

The wire guide housing 38 constitutes a tension cap means in which the first and second elongated segments 40,42 have an opening 44 formed therebetween through out the length thereof. The opening in the embodiment of FIGS. 3,4 is generally square and captures a wire electrode 46 of round cross-section. The elongated segment 42 includes a fixed reference surface 41 throughout the length thereof to supportingly receive a wire electrode segment 46 which extends through the housing 38. The other of said segments 40 functions as a tension cap and includes a pair of tapered surfaces 48, 50 on the exit end 51 thereof. The tapered surface 50 defines a first plane that is inclined inwardly of the tension cap. The free state position of this surface is shown in broken line identified by reference numeral 52 in FIG. 3. The tapered surface 48 is arranged generally perpendicularly with respect to the tapered surface 50 as shown in FIG. 3. The tapered surface 50 is in a second plane which also is inclined inwardly of the tension cap. Together the tapered surfaces 48, 50 define pressure surfaces that grip the guided electrode segment 46 only at the exit end of the wire guide housing 38.

The wire guide housing 38 includes a flex retaining ring 54 with spaced ends 56,58 having holes to receive a tool for spreading the ring 54 so that it can be seated in the housing 38. More particularly, the ring 54 is seated in grooves 60, 62 formed in the entrance end 63 of each of the elongated segments 40,42. The ring 54 forces the elongated segments 40, 42 toward each other and thus directs a compound tension force along the arrow 64 shown in FIGS. 3 and 4. The tapered surfaces 48, 50 because of their inclination impose a tension force on the guided wire 46 which is limited by the configuration of the parts to maintain a low frictional force on the guided wire 46 though out the life of the electrode guide. The biasing action of the ring 54 will compensate for wear of the tapered surfaces 48, 50 and the force resolution action of the tapered surfaces will continue so long as an inward inclination of the surfaces remains. The relief function of the tapered surfaces 48,50 is shown the clearance gap 66 that is accentuated to represent a desired minimum clearance of 0.0005 inches between a surface 67 of tension cap 40 and the fixed wire guide body 42.

Figure 6:
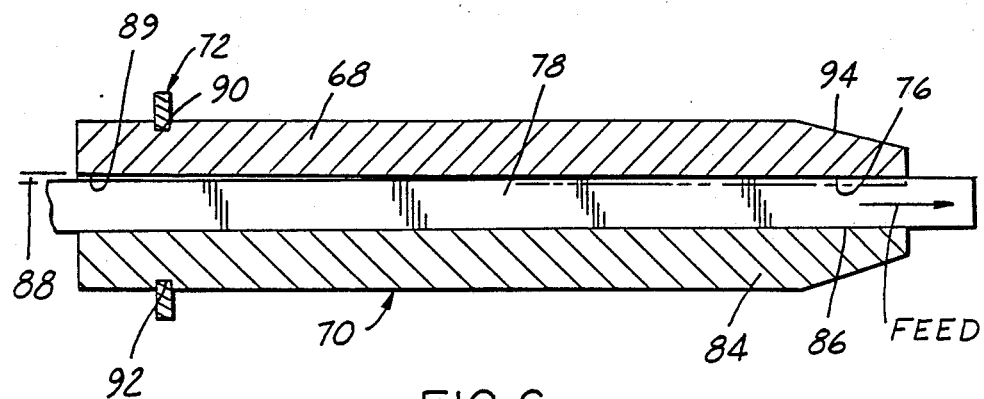
FIG. 6 is an longitudinal-sectional view taken along the line 6—6 of FIG. 5 looking in the direction of the arrows.

The second embodiment of the invention disclosed in FIGS. 5 and 6 includes a tension cap 68 connected to a fixed wire guide body 70 by means of a flex retaining ring 72. In this embodiment the tension cap 68 is configured as an elongated member with a pair of tapered surfaces 74, 76 arranged at 90 degrees but of different length to capture two sides of a wire electrode 78 having a rectangular cross-section as shown in FIG. 5.

The tapered surfaces 74, 76 incline inwardly of a rectangularly configured end opening 80 formed by the surfaces 74,76 and the L legs 82,84 of the fixed wire guide body 70. The leg 82 defines a guide surface for one side 85 of the wire electrode 78 and the leg 84 defines a guide surface for the side 86 of the wire electrode 78. The other surfaces of the wire electrode 78 have minimum cap to body clearances as shown accentuated at 88 in FIG. 6 between surface 89 of the tension cap 68 and the electrode 78.

The flex retaining ring 72 is seated in grooves 90, 92 formed in the cap and body respectively and the ring thereby functions to move them together at a break 79 thereby to impose a force at the exit end 94 of the wire guide assembly 96 which is resolved by the tapered surfaces 74, 76 to produce a compound tension force on the wire electrode 78 as shown by arrow 98 in FIGS. 5,6.

Although the disclosure describes and illustrates a preferred embodiment of the invention, it is to be understood that the invention is not limited to such embodiment. Many variations and modifications will be apparent to those skilled in the art. For a definition of the invention reference is made to the appended claims.

What is claimed is:

1. In a wire electrode holder for guiding a wire electrode to a conductive workpiece for establishing a stable spark gap for electrically discharge machining the workpiece the improvement comprising: wire guide housing means having a first elongated segment and a second elongated segment; each of said segments separated from one another at a break along the length thereof; flexible retaining means connecting said first and second segments at one end thereof to bias said segments toward one another at the opposite end thereof; and means on the opposite end of said first and second segments coacting to produce a compound tension force on a wire electrode direct through said wire guide housing means only at the opposite end of segments to maintain a low frictional force thereon during relative movement of a wire electrode with respect to said wire guide housing means; said coacting means further serving to reference the position of said wire eectrode with respect to one of said first and second segments.

2. In the combination of claim 1, said means for producing a compound pressure force including coacting surfaces at least one of which is tapered with respect to the other surfaces to place the wire electrode under tension as it exits said wire guide housing means.

3. In the combination of claim 1, said flexible retaining means including a flex retaining ring and groove means in said wire guide housing means for spring biasing said longitudinal segments together, said means for producing a compound pressure force including coacting surfaces at least one of which is tapered with respect to the other surfaces to place the wire electrode under tension as it exits said wire guide housing means.

4. In the combination of claim 1, said flexible retaining means including a flex retaining ring and groove means in said wire guide housing means for spring biasing said longitudinal segments together.

5. A wire electrode holder for guiding a wire electrode to form a spark gap at a conductive workpiece comprising: tension cap means including a first elongated segment, a second elongated segment cooperating with said tension cap means to define an opening formed therebetween through out the length thereof; one of said segments being L shaped and including a fixed reference surface throughout the length thereof to supportingly receive a wire electrode extending through said tension cap means; the other of said segments including means thereon to guide the wire electrode only at one end thereof; spring means connected to said first and second elongated segments to force them toward each other; and means for producing a compound tension force on said wire electrode only as it leaves said tension cap means thereby to maintain a low frictional force on the wire electrode as it is moved relative to said tension cap means and wherein the compound tension force positions the wire electrode with respect to one of said elongated segments.

6. In the combination of claim 5, said spring means being a flex retaining ring, means forming grooves in said first and second elongated segments for receiving said flex retaining ring so as to bias said first and second elongated segments toward one another, said means for producing a compound tension force on the wire electrode including a plurality of surfaces at least one of which is a tapered surface which places the wire electrode in tension as it exits said tension cap means.

7. In the combination of claim 5, said spring means being a flex retaining ring, means forming grooves in said first and second elongated segments for receiving said flex retaining ring so as to bias said first and second elongated segments toward one another.

8. In the combination of claim 5, said means for producing a compound tension force on the wire electrode including a plurality of surfaces at least one of which is a tapered surface which places the wire electrode in tension as it exits said tension cap means.

9. A wire guide assembly for an electrical discharge machine for electrically discharge machining a workpiece feature at a spark gap formed between an electrically conductive workpiece and a wire electrode comprising: a wire guide housing means having an entrance and an exit; a pair of separate wire guide members; means for releasably connecting said wire guide members together at one end thereof to bias them together at the exit end of said wire guide housing; said wire guide members having oppositely facing longitudinal surfaces thereon; and coacting portions of said longitudinal surfaces producing a compound tension force on the wire electrode at the exit of said wire guide housing means and spacing the wire electrode from one of said longitudinal surfaces at other points thereon so as to produce a low frictional force on the wire electrode as it is positioned with respect to said wire guide housing means.

10. In the combination of claim 9, said means for releasably connecting said wire guide members together including a flex retaining ring and groove means in said one end of said wire guide members for forcing said wire guide members toward one another.

11. In the combination of claim 9, said coacting portions of said longitudinal surfaces including at least one tapered surface engageable with the wire electrode to place it in tension at the point it exits said wire guide housing means.

12. In the combination of claim 9 said means for releasably connecting said wire guide members together including a flex retaining ring and groove means in said one end of said wire guide members for forcing said wire guide members toward one another, said coacting portions of said longitudinal surfaces including at least one tapered surface engageable with the wire electrode to place it in tension at the point it exits said wire guide housing means.

* * * * *